F. L. MARTENETTE.
ALMOND HULLER.
APPLICATION FILED FEB. 10, 1916.

1,230,001.

Patented June 12, 1917.
2 SHEETS—SHEET 1.

WITNESSES:
L. J. Forde
B. M. Doolin

INVENTOR
Francis L. Martenette
By Strong & Townsend
ATTORNEYS

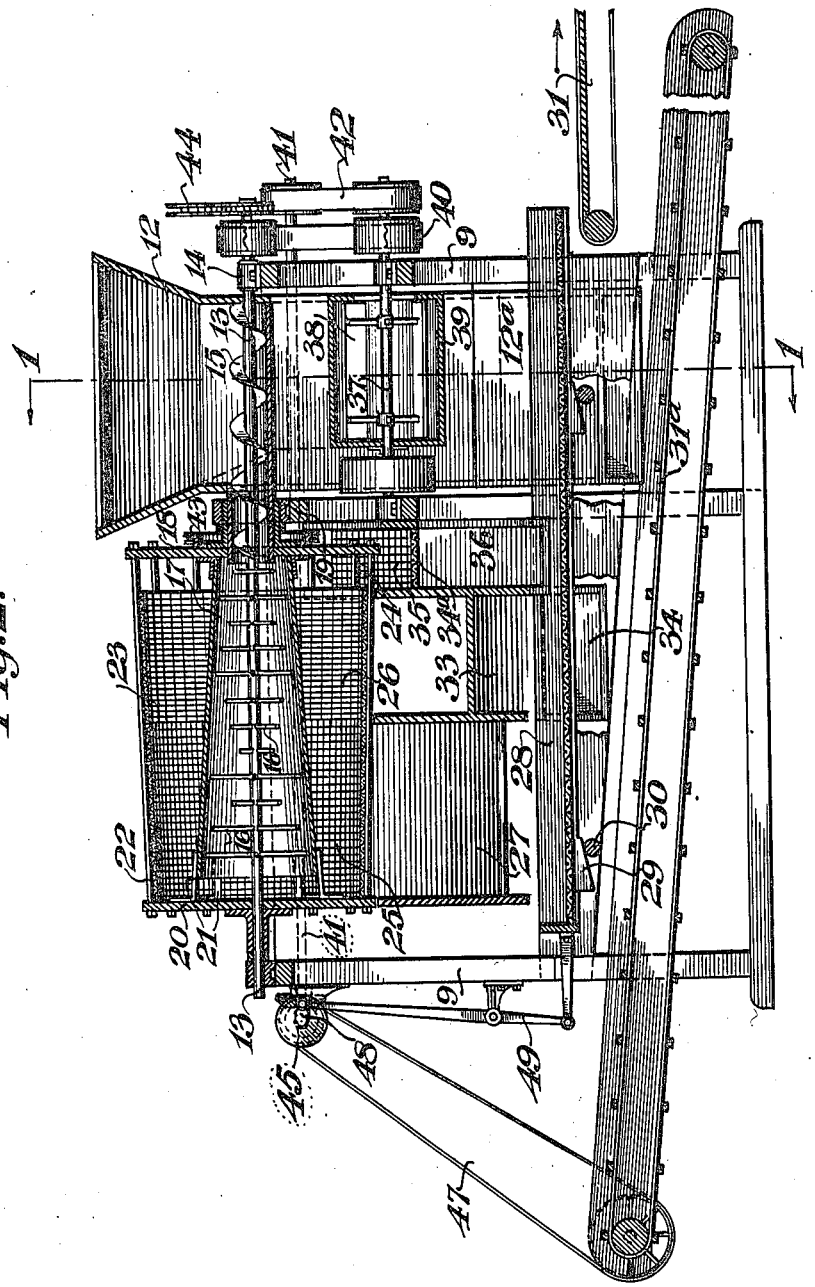

what
UNITED STATES PATENT OFFICE.

FRANCIS L. MARTENETTE, OF CHICO, CALIFORNIA.

ALMOND-HULLER.

1,230,001.　　　　　Specification of Letters Patent.　　Patented June 12, 1917.

Application filed February 10, 1916. Serial No. 77,412.

*To all whom it may concern:*

Be it known that I, FRANCIS L. MARTENETTE, a citizen of the United States, residing at Chico, in the county of Butte and State of California, have invented new and useful Improvements in Almond - Hullers, of which the following is a specification.

This invention relates to almond hullers; and has for its object to simplify and improve the construction and operation of such devices.

In carrying out this object, I employ a conical drum open at both ends and rotatable at a comparatively slow speed, within which drum is arranged a beater rotatable at a higher speed, means for feeding nuts longitudinally to the drum, a screening cylinder inclosing said drum and rotatable therewith and having a closed and an open end and provided with a comparatively small mesh adjacent to its closed end to discharge the hulled nuts, and a wider mesh centrally thereon to discharge the hulls, deflectors for conveying the hulled nuts to a shaker screen, a delivery conveyer to receive the nut from said shaker screen, a deflector for conveying the hulls to a waste conveyer, and a screening chute to receive the unhulled nuts and such other product as may be discharged from the open end of the screening cylinder, whereby to discharge the unhulled nuts into the supply hopper for rerunning and the hulled nuts mingled therewith into a supplemental deflector which empties into the shaking screen.

One form which my invention may assume is exemplified in the following description and illustrated in the accompanying drawings, in which—

Fig. 2 shows a vertical, longitudinal, sectional view, taken on the line 2—2 of Fig. 1.

Figure 1:
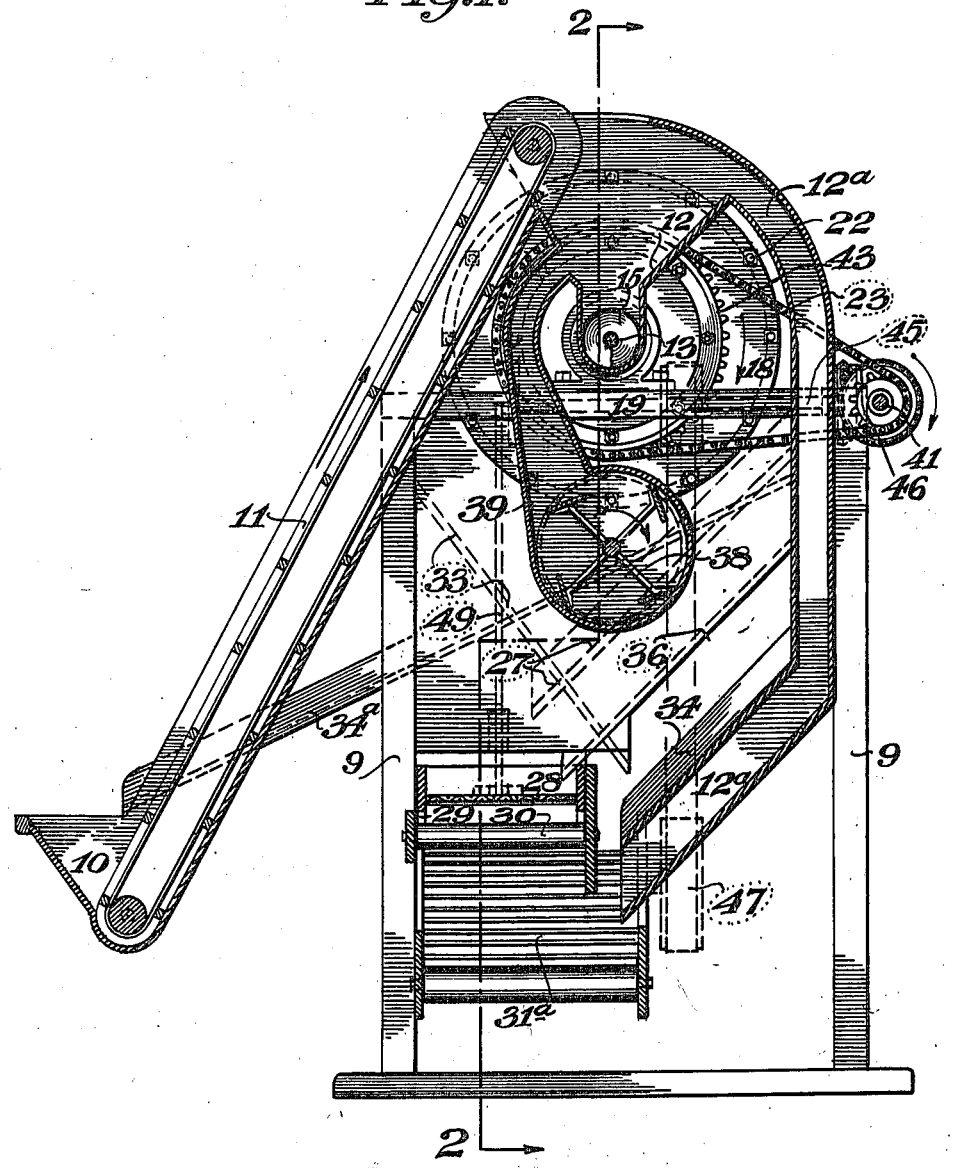
Figure 1 shows a vertical, cross sectional view of a device embodying my invention, taken on the line 1—1 of Fig. 2.

Referring in detail to the drawings, I have shown a main frame 9, provided with a supply hopper 10 at one side and having a vertical feed conveyer 11 running to a feed hopper 12 arranged on top of the frame. Within the feed hopper, and extending to one side thereof, is a shaft 13 carried in bearings 14 on the frame and fitted with a screw-feed 15 lying within the hopper and with a series of beater teeth 16 at its extended end. Inclosing the beater is a cone-shaped drum 17, secured at its smaller or forward end to a disk 18 journaled on a frame bar 19, and at its larger or rear end to a disk 20 journaled on the shaft 13, said drum being spaced apart from the latter disk by clips 21 to provide an opening through which the contents of the drum may pass out of the larger end thereof.

Rods 22 are arranged between the disks 18 and 20 and a screen 23 is laid over the same, forming a perforated cone-shaped drum inclosing the drum 17, closed at its small end by wall 20 and open at its larger forward end to provide a discharge opening 24. It is to be noted that the drums 17 and 23 diverge in opposite directions to each other and that the drum 17 opens at its larger end into the small end of the drum 23. The screen adjacent to the closed end of the cylinder is made up of a small mesh 25 and at its other end with a somewhat larger mesh 26.

Beneath the area of the small mesh is an inclined chute or deflector 27 running to a shaker screen 28, the latter fitted with inclined projections 29 working over rollers 30 to impart a vertical movement thereto, when the screen is reciprocated, operating to deposit the nuts from its open end into a delivery conveyer 31 and sift the leaves and dirt to the waste conveyer 31ª located below.

Beneath the larger mesh of the screening cylinder is a second deflector 33, inclined oppositely from the deflector 27 and running to an oppositely inclined chute or deflector 34, the latter being arranged below the chute 27 and emptying into the waste conveyer 31 to thereby dispose of the hulls.

Below the open or discharge end of the screening cylinder is a chute 34ª inclined in the same direction as the chute 27 and provided with a screened bottom 35 and terminating above the supply hopper 10 and emptying therein, whereby to return the unhulled nuts to the feed hopper above for rehulling. Beneath the chute 34ª is a deflector 36, inclined in the same direction therewith and emptying into the shaker screen 28 for the purpose of catching any hulled nuts which may have been discharged with the unhulled nuts through the open end of the screening cylinder and consequently sifted through the screen 35.

A power shaft 37 is arranged below the shaft 13 and carries a fan 38, which, by means of a casing 39, directs a blast of air upwardly and outwardly through the feed hopper for separating loose leaves at the beginning of the operation. Preferably, the drive for the various parts is from shaft 37 by a belt 40 to the shaft 13. A counter-driving shaft 41 is arranged along one side of the frame and has a driving connection 42 with the shaft 37 and in turn drives, by decreased speed, the cylinder screen and conical drum through a sprocket chain and wheel connection 43. The vertical feed conveyer through a chain connection 44 is driven from the feed shaft 13.

At one end of the frame is a right angular shaft 45 having a beveled gear connection 46 with the counter-driving shaft 41 and which is connected, by a belt 47, to the waste conveyer for driving the same, and carries a cam 48 to actuate a rock-arm 49, the latter connected with the shaker screen to impart reciprocal movement thereto.

In the practical operation of the device described, almonds are fed in at the supply hopper 10 and elevated by the conveyer to the feed hopper 12 where in falling the loose leaves are blown out by the fan and pass through a conduit 48 to the waste conveyer. From the feed hopper the nuts are taken to the conical drum by the screw-feed and there hulled; the beater preferably rotating at five hundred to eight hundred revolutions per minute and the drum revolving at twenty-five revolutions per minute. The nuts are then discharged at the large end of the drum and fall on the screening cylinder, returning longitudinally therethrough, and in passing slowly over the variably sized mesh of the screen will be separated from the hulls and also from the unhulled nuts. The first area of the screen sifts the hulled nuts which fall below to the deflector 27 and thence to the shaker screen where they are cleaned of all leaves and dirt and deposited on the delivery conveyer. The second area of the screen sifts the hulls which fall below to the deflector 33 and thence to the waste conveyer. The forward end of the screening cylinder being open discharges the residue, which consists particularly of unhulled nuts, and these are carried by the chute 34ª back to the supply hopper 10; but in order to increase the efficiency of the device said chute 34ª is provided with a screen which will permit any hulled nuts present to sift through and fall upon the supplemental deflector 36 and onto the shaker screen.

While I have shown and described but one form of device herein, it will be understood that the same is susceptible of modification and, therefore, changes in the construction and arrangement of the several parts may be employed without departing from the spirit of my invention as disclosed in the appended claims.

Having thus described my invention, what I claim and desire to secure by Letters Patent is—

1. In an almond huller, hulling mechanism comprising a high-speed, rotatable beater, a low-speed imperforate conical drum inclosing the same, and open at its ends, whereby the nuts are fed longitudinally therethrough and out of the larger end of the drum, a screening cylinder inclosing said drum and rotatable therewith, said screening cylinder being provided with a variable mesh and an open discharge end opposite to the discharge end of the drum whereby to separate the hulled nuts from the hulls and the unhulled nuts from the others, a shaker screen to receive the hulled nuts from said cylinder, a waste conveyer to receive the hulls from said cylinder, and a return conveyer to receive the unhulled nuts therefrom.

2. In an almond huller, hulling mechanism, screening and separating mechanism therefor to separately discharge the hulled nuts, the hulls and the unhulled nuts, a deflector for each discharge area of said screening and separating mechanism, a shaker screen for the first deflector, a waste conveyer for the second deflector and a return conveyer for the third deflector, means in connection with said third deflector for sifting hulled nuts passing therethrough, and a supplemental deflector below said third deflector for discharging the hulled nuts onto said shaker screen.

3. In a nut huller, mechanism for removing the hulls from the nuts, means for separating the hulled nuts from the hulls, means for separating any unhulled nuts from the hulled nuts and the hulls, means for delivering the hulled nuts, the hulls and the unhulled nuts separately, and means for automatically conveying the delivered unhulled nuts back into the hulling mechanism.

4. In a nut huller, mechanism for removing the hulls from the nuts, means for separating the hulled nuts from the hulls, means for separating any unhulled nuts from said hulled nuts and said hulls, means for separating from said unhulled nuts any hulled nuts that may be mixed therewith, and means for delivering the unhulled nuts to the hulling mechanism.

5. In a nut huller, mechanism for removing the hulls from the nuts, means for separating the hulled nuts from the hulls, means for separating any unhulled nuts from said hulled nuts and said hulls, means for separating from said unhulled nuts any hulled nuts that may be mixed therewith, means for delivering the hulled nuts, hulls and unhulled nuts separately, and means for automatically conveying the unhulled nuts back into the hulling mechanism.

6. In a huller, a supporting structure, a shaker screen thereon, an underlying conveyer, a hulling mechanism including a rotary screen arranged above the shaker screen and provided with a variable mesh, an inclined deflector disposed beneath one discharge area of the rotary screen and leading to the shaker screen, and a second deflector disposed inclinedly opposite to the first deflector beneath the rotary screen and leading to the conveyer.

7. In a huller, a supporting structure, a shaker screen thereon, an underlying conveyer, a hulling mechanism including a rotary screen arranged above the shaker screen and provided with a variable mesh, an inclined deflector disposed beneath one discharge area of the rotary screen and leading to the shaker screen, a second screen arranged beneath the rotary screen and leading to the conveyer, means for feeding nuts to the hulling mechanism, and a chute leading from beneath the rotary screen to the feeding means, said chute having a screened bottom.

8. In a huller, a supporting structure, a shaker screen thereon, an underlying conveyer, a hulling mechanism including a rotary screen arranged above the shaker screen and provided with a variable mesh, an inclined deflector disposed beneath one discharge area of the rotary screen and leading to the shaker screen, a second screen arranged beneath the rotary screen, and leading to the conveyer, means for feeding nuts to the hulling mechanism, a chute leading from beneath the rotary screen to the feeding means, said chute having a screened bottom, and a deflector arranged beneath the screened bottom of the chute and leading to the shaker screen.

9. In a huller, a supporting structure, a shaker screen thereon, an underlying conveyer, a hulling mechanism including a rotary screen arranged above the shaker screen and provided with a variable mesh, a feed hopper for the hulling mechanism, means for delivering an air blast through one side of the hopper, a conduit leading from the opposite side of the hopper down to the conveyer, a deflector arranged beneath the rotary screen and leading to the conveyer, and a second deflector arranged beneath the rotary screen and leading to the shaker screen.

In testimony whereof I have hereunto set my hand in the presence of two subscribing witnesses.

FRANCIS L. MARTENETTE.

Witnesses:
  J. M. LOWRY,
  AMY T. OLSEN.